(12) United States Patent
Stadelmeier et al.

(10) Patent No.: US 9,525,442 B2
(45) Date of Patent: Dec. 20, 2016

(54) OFDM TRANSMITTER COMPRISING A PRE-DISTORTION UNIT, AN OFDM MODULATOR AND A FILTER

(71) Applicant: SONY CORPORATION, Tokyo (JP)

(72) Inventors: Lothar Stadelmeier, Stuttgart (DE); Jan Zoellner, Braunschweig (DE); Joerg Robert, Vreden (DE); Philipp Hasse, Braunschweig (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/766,586

(22) PCT Filed: Feb. 11, 2014

(86) PCT No.: PCT/EP2014/052619
§ 371 (c)(1),
(2) Date: Aug. 7, 2015

(87) PCT Pub. No.: WO2014/124930
PCT Pub. Date: Aug. 21, 2014

(65) Prior Publication Data
US 2016/0006464 A1 Jan. 7, 2016

(30) Foreign Application Priority Data
Feb. 15, 2013 (EP) ..................... 13155522

(51) Int. Cl.
*H04B 1/04* (2006.01)
*H04L 25/03* (2006.01)
*H04L 27/26* (2006.01)

(52) U.S. Cl.
CPC ....... *H04B 1/0475* (2013.01); *H04L 25/03828* (2013.01); *H04L 27/2626* (2013.01)

(58) Field of Classification Search
CPC .......... H04B 15/005; H04B 17/29; H04B 3/54
(Continued)

(56) References Cited

U.S. PATENT DOCUMENTS 6,167,024 A * 12/2000 Upton ................... H04J 14/005
370/203
8,185,065 B2 * 5/2012 McCallister .......... H03F 1/3247
375/296

(Continued)

FOREIGN PATENT DOCUMENTS

EP    1 962 438       8/2008
EP       1962438 A1 * 8/2008 ............... H04B 3/54

OTHER PUBLICATIONS

U.S. Appl. No. 14/771,282, filed Aug. 28, 2015, Asjadi.
(Continued)

*Primary Examiner* — Freshteh N Aghdam
(74) *Attorney, Agent, or Firm* — Oblon, McClelland, Maier & Neustadt, L.L.P.

(57) ABSTRACT

An OFDM encoding apparatus for encoding OFDM symbols into an OFDM signal includes: a pre-distortion unit that pre-distorts OFDM symbols into pre-distorted OFDM symbols, the OFDM symbols including payload data and each being carried on multiple OFDM subcarriers; an OFDM generator that generates an OFDM signal from the pre-distorted OFDM symbols by OFDM modulating the pre-distorted OFDM symbols; and a filter that filters the OFDM signal to obtain a filtered OFDM signal, the filter being configured to attenuate the spectrum of the OFDM signal in frequency bands outside the signal bandwidth of the OFDM signal by applying a filter transfer function to the OFDM signal. The pre-distortion unit is configured to apply a pre-distortion transfer function equal to the inverse of the filter transfer function to the OFDM symbols.

16 Claims, 5 Drawing Sheets

(58) Field of Classification Search
USPC .................................. 375/260, 267, 295, 296
See application file for complete search history.

(56) References Cited

U.S. PATENT DOCUMENTS

| | | | |
|---|---|---|---|
| 9,048,902 | B2 | 6/2015 | Robert et al. |
| 2009/0175244 | A1* | 7/2009 | Schilling ................. H04B 1/71 370/335 |
| 2010/0027600 | A1 | 2/2010 | Schwager et al. |
| 2010/0085849 | A1* | 4/2010 | Yin ................. G11B 20/10009 369/47.15 |
| 2012/0147938 | A1 | 6/2012 | Schwager et al. |
| 2012/0230385 | A1* | 9/2012 | Currivan ........... H04L 25/03057 375/233 |
| 2013/0051404 | A1* | 2/2013 | Binder ...................... H04L 5/06 370/467 |

OTHER PUBLICATIONS

Eberle, W., et al., "80-Mb/s QPSK and 72-Mb/s 64-QAM Flexible and Scalable Digital OFDM Transceiver ASICs for Wireless Local Area Networks in the 5-GHz Band", IEEE Journal of Solid-State Circuits, vol. 36, No. 11, (2001), XP11061618, pp. 1829-1838.
"ETSI EN 302 769 V1.1.1 (Apr. 2010), Digital Video Broadcasting (DVB); Frame structure channel coding and modulation for a second generation digital transmission system for cable systems (DVB-C2)", ETSI, (2010), (Total pp. 110).
International Search Report Issued Apr. 24, 2014 in PCT/EP2014/052619 Filed Feb. 11, 2014.

* cited by examiner

OFDM TRANSMITTER COMPRISING A PRE-DISTORTION UNIT, AN OFDM MODULATOR AND A FILTER

BACKGROUND

Field of the Disclosure

The present disclosure relates to an OFDM encoding apparatus and a corresponding OFDM encoding method for encoding OFDM symbols into an OFDM signal. Further, the present disclosure relates to a transmitting apparatus and a corresponding transmitting method. Still further, the present disclosure relates to a computer program and a non-transitory computer-readable recording medium.

Description of Related Art

Many different systems, like systems in accordance with ATSC 3.0, DVB-T2, DOCSIS 3.1 or the DVB second generation cable transmission standard (DVB-C2; e.g. described in ETSI EN 302769 V1.1.1 (2010 April)), use OFDM (Orthogonal Frequency Division Multiplex) for the transmission of payload data. While OFDM has many advantages, it has the disadvantage that the resulting OFDM signal (in the frequency domain) has rather high shoulders at the edge of the spectrum. Conventionally, filtering is applied after the OFDM generation to reduce the effects onto neighboring channels. This is especially important for OFDM systems that deploy high QAM modulations (e.g. DVB-C2 using up to 4096-QAM), which requires very high signal-to-noise ratios and thus high signal levels. However, steep filters applied after the OFDM generation reduce the signal quality of the OFDM signal in several ways. The impulse response of the filter introduces inter symbol interference and consumes part of the available Guard Interval. In case of DVB-C2 with Guard Interval 1/128, the overall Guard Interval length is only 32 samples, which does not allow for long filters. Furthermore, the passband ripple of the filter (in the frequency domain) deteriorates the OFDM subcarriers.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide an OFDM encoding apparatus and a corresponding OFDM encoding method for encoding OFDM symbols into an OFDM signal which do not require conventionally used long filters for filtering of the OFDM signal. It is a further object to provide a transmitting apparatus and a corresponding transmitting method as well as a corresponding computer program for implementing said OFDM encoding method and a non-transitory computer-readable recording medium for implementing said OFDM encoding method.

According to an aspect there is provided an OFDM encoding apparatus for encoding OFDM symbols into an OFDM signal, comprising a pre-distortion unit that pre-distorts OFDM symbols into pre-distorted OFDM symbols, said OFDM symbols comprising payload data and each being carried on multiple OFDM subcarriers, an OFDM generator that generates an OFDM signal from said pre-distorted OFDM symbols by OFDM modulating said pre-distorted OFDM symbols, and a filter that filters said OFDM signal to obtain a filtered OFDM signal, said filter being configured to attenuate the spectrum of the OFDM signal in frequency bands outside the signal bandwidth of said OFDM signal by applying a filter transfer function to said OFDM signal, wherein said pre-distortion unit is configured to apply a pre-distortion transfer function corresponding to the inverse of said filter transfer function to said OFDM symbols.

According to a further aspect there is provided a transmission apparatus comprising a frame builder for building frames comprising said OFDM symbols, an OFDM encoding apparatus as claimed in claim 1 for encoding said OFDM symbols into an OFDM signal, and a transmitter for transmitting said OFDM signal.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Preferred embodiments are defined in the dependent claims. It shall be understood that the claimed methods, the claimed computer program and the claimed computer-readable recording medium have similar and/or identical preferred embodiments as the claimed OFDM encoding apparatus and as defined in the dependent claims.

One of the aspects of the disclosure is to pre-distort the OFDM symbols (in the frequency domain) before they are processed by the OFDM generator to obtain an OFDM signal (in the time domain) which is then filtered to reduce the shoulders (out-of-band emissions). The filter does not need to have a flat characteristic within the passband (the effective signal bandwidth that shall be received by a receiving apparatus) so that a smaller filter having less coefficients than a conventionally used filter can be used. However, in combination with the pre-distortion a flat characteristic within the passband is obtained. Thus, a simpler, much shorter and thus cheaper filter can be used, but still a better frequency characteristic is finally obtained by the proposed solution. In particular, a filter with fewer taps (i.e. having a cheaper and shorter impulse response) can be used because resulting frequency tilt is reduced by subcarrier specific amplitude changes. Further, a much smaller portion of the guard intervals is "consumed".

It is to be understood that both the foregoing general description and the following detailed description are exemplary, but are not restrictive of the disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
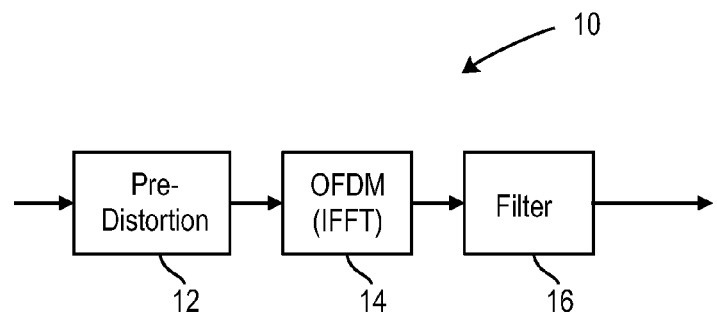
FIG. 1 shows a schematic diagram of an OFDM encoding apparatus according to the present disclosure.

Referring now to the drawings, wherein like reference numerals designate identical or corresponding parts throughout the several views, FIG. 1 shows a schematic diagram of an OFDM encoding apparatus 10 according to the present disclosure. It comprises a pre-distortion unit 12 that pre-distorts OFDM symbols into pre-distorted OFDM symbols (in the frequency domain), said OFDM symbols comprising payload data (and, potentially other data like signaling data and pilot signals) and each being carried on multiple OFDM subcarriers. The OFDM encoding apparatus further comprises an OFDM generator 14 that generates an OFDM signal (in the time domain) from said pre-distorted OFDM symbols by OFDM modulating said pre-distorted OFDM symbols, said OFDM generator 14 generally corresponding to a conventional OFDM generator 14 as e.g. known from transmitter in accordance with the DVB-T2 or DVB-C2 standard. Still further, the OFDM encoding apparatus 10 comprises a filter 16 that filters said OFDM signal to obtain a filtered OFDM signal.

According to the present disclosure the filter 16 is configured to attenuate the spectrum of the OFDM signal in frequency bands outside the signal bandwidth of said OFDM signal by applying a filter transfer function to said OFDM signal. Accordingly, the pre-distortion unit 12 is configured to apply a pre-distortion transfer function corresponding to the inverse of said filter transfer function to said OFDM symbols.

Figure 2A:
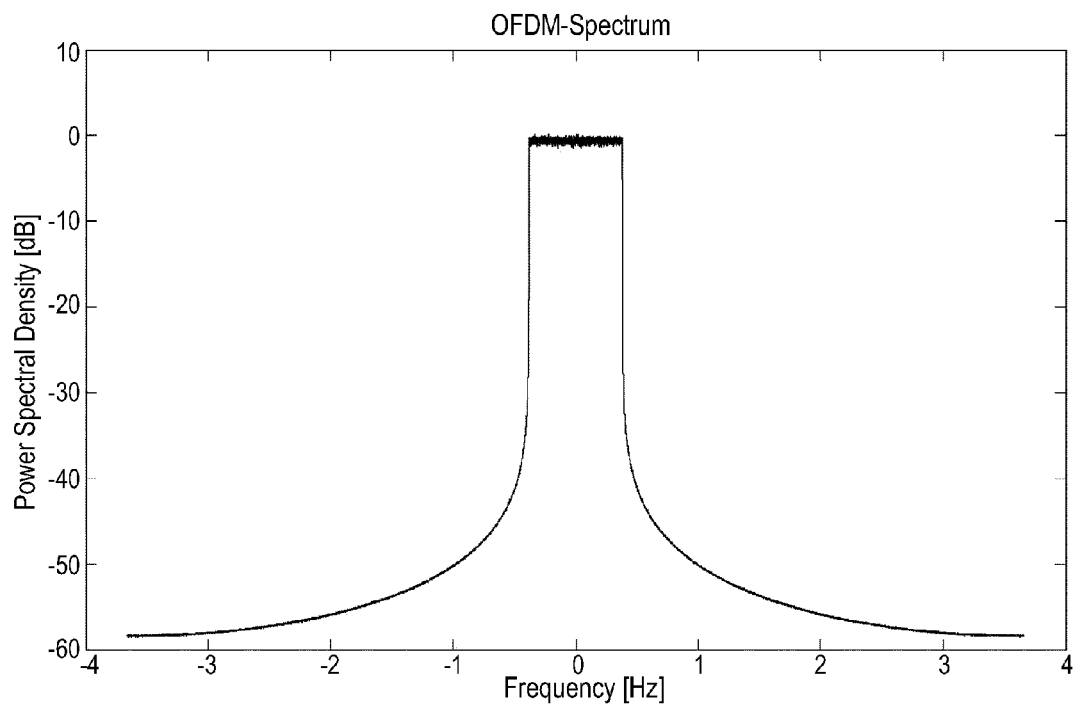
FIGS. 2A-2D show diagrams of the power spectral density of various signals of an OFDM channel according to the present disclosure.
Figure 2B:
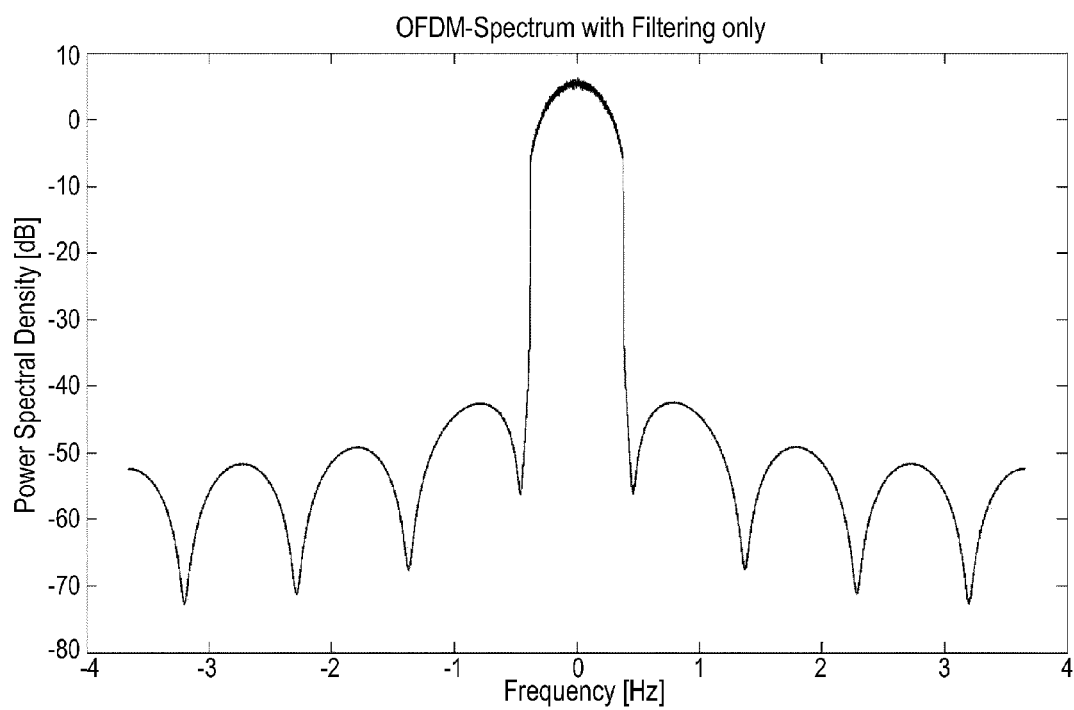

The filter 14 is applied after the OFDM generation (generally including an IDFT) to reduce the shoulders (of the generated OFDM signal). Though, this filter 14 does not necessarily have a flat characteristic within the pass-band, leading to only few filter coefficients for the required impulse response of the filter. An example is shown in FIGS. 2A-2D. FIG. 2A shows the power spectral density of the original OFDM signal without any filtering. FIG. 2B shows the power spectral density of the filtered OFDM signal. This curve does no longer have a flat characteristic within the signal bandwidth BW, which is caused by the low number of filter coefficients of the filter 14, i.e. because—compared to conventional OFDM encoding apparatus—the filter 14 is generally much smaller (i.e. has less filter coefficients). However, the filtered OFDM signal depicted in FIG. 2B shows a good attenuation of the out-of-band emissions (i.e. in the spectrum outside the signal bandwidth BW).

Figure 2C:
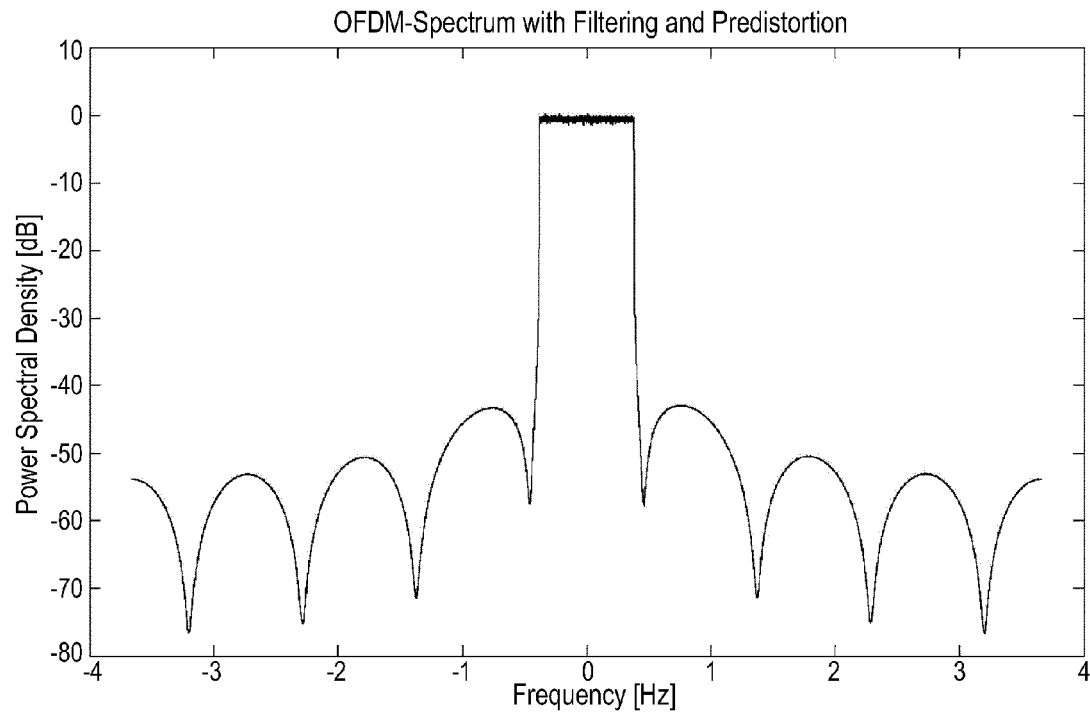
Figure 2D:
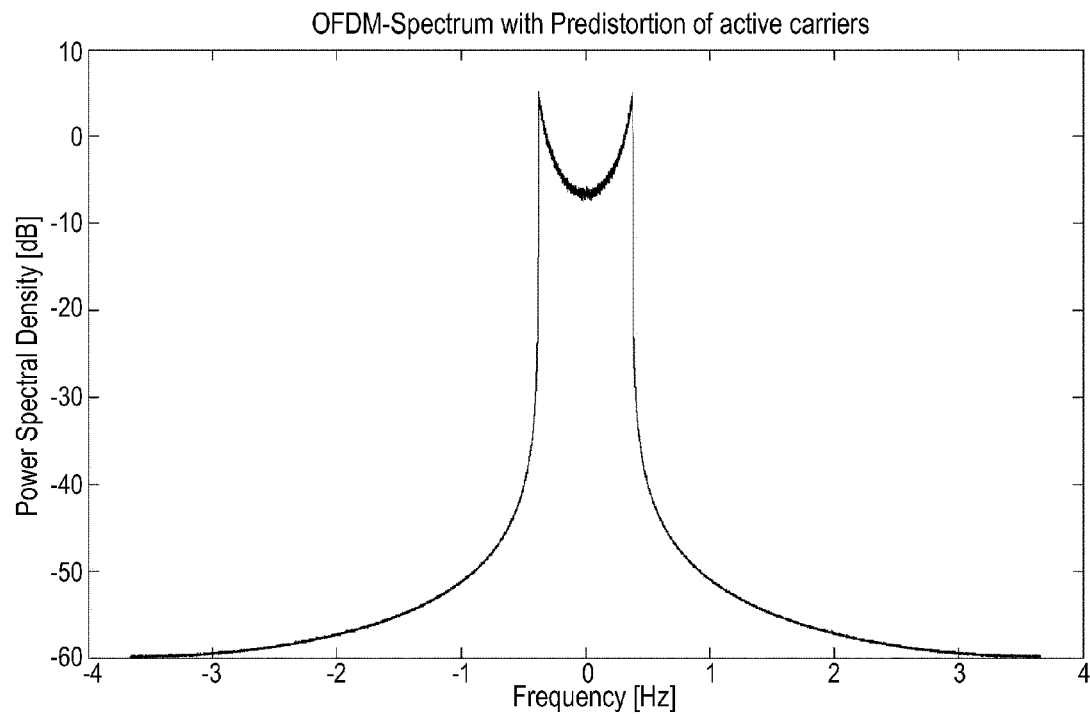

In order to obtain a flat characteristic in the signal bandwidth BW a (preferably linear) pre-distortion is used according to the present disclosure. The term linear refers to a pre-distortion in the sense of a linear time invariant (LTI) system. More precisely, the pre-distortion performed preferably depends only on the filter applied and can be undone by multiplication with constant factors (per carrier). The pre-distortion of the pre-distortion unit 12 compensates the selectivity of the filter 16. This is particularly reached by the multiplication of the individual OFDM subcarriers (in the frequency domain), in particular each OFDM subcarrier, with the inverse of the transfer function of the filter 16 at the respective subcarrier frequency. The analytical calculation of the required coefficients is quite simple by means of the filter's impulse response. FIG. 2C show the power spectral density of the same filter 16 as applied for curve shown in FIG. 2B, but with the described pre-distortion. The curve shown in FIG. 2C ideally overlaps with the non-filtered curve (shown in FIG. 2A) in the signal bandwidth BW, but still shows the high attenuation in the other parts of the spectrum. For comparison, FIG. 2D shows the curve of the pre-distorted (but not filtered) OFDM spectrum.

Figure 3A:
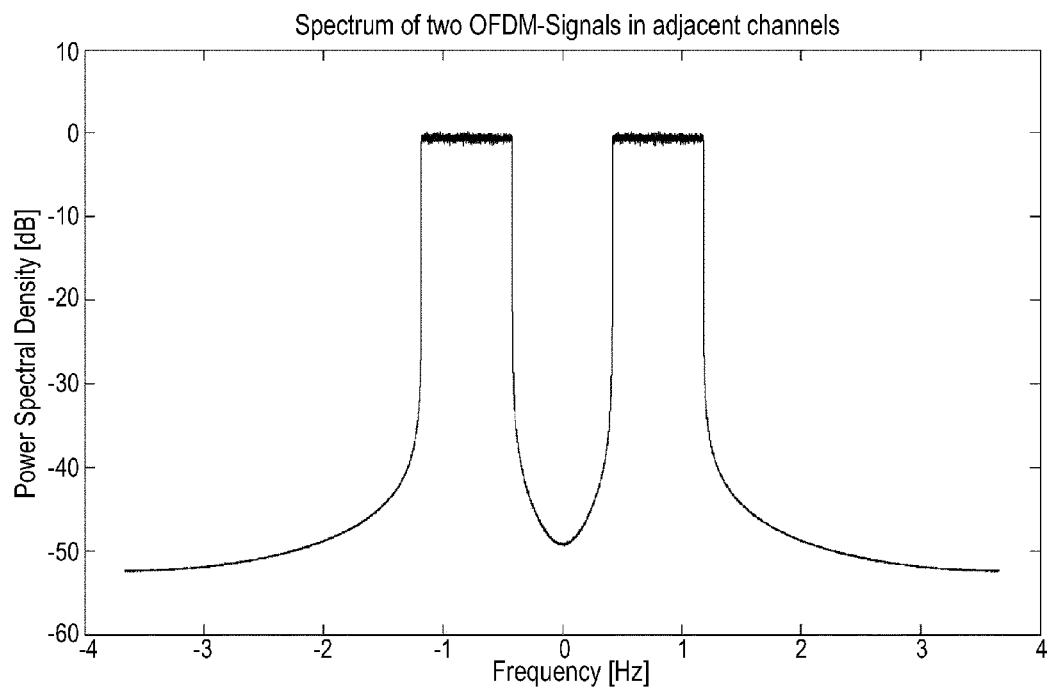
FIGS. 3A-3B show diagrams of the power spectral density of various signals of two OFDM channels according to the present disclosure.
Figure 3B:
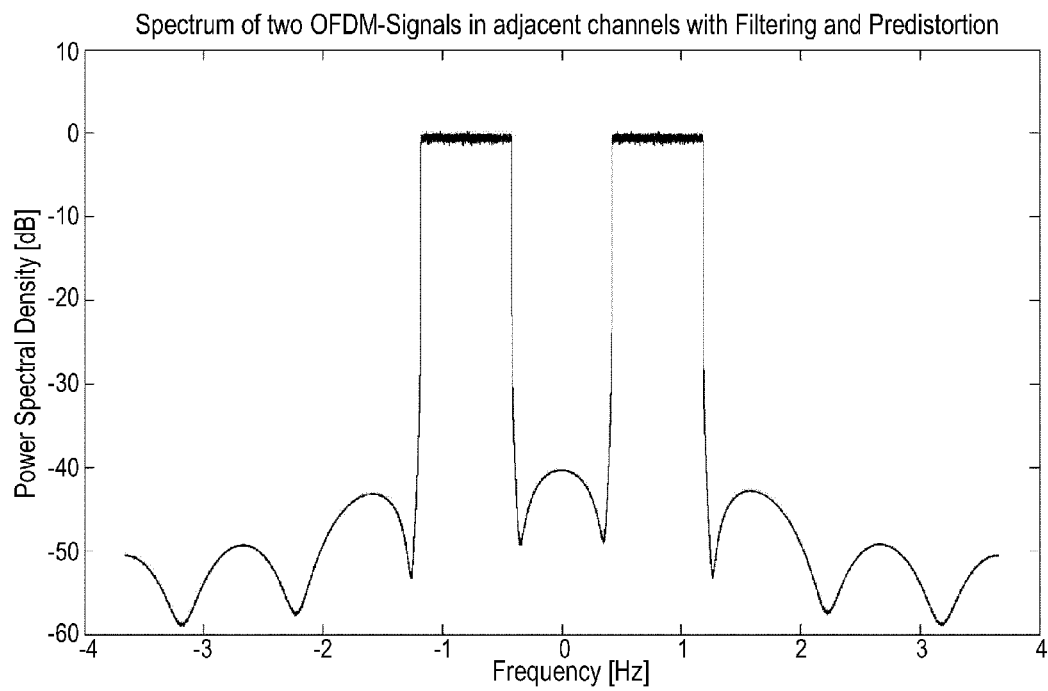

FIGS. 3A-3B show various curves of the spectral density of a DVB-C channel (of signal bandwidth 8 MHz) with two adjacent DVB-C2 4K channels. FIG. 3A shows the power spectral density of the original DVB-C2 signal without any filtering. FIG. 3B shows the power spectral density of DVB-C2 signal after low-pass filtering and with prior pre-distortion (also called pre-equalization) as in the proposed approach. The curve shown in FIG. 3 shows the best performance, i.e. the lowest power within the signal bandwidth of the DVB-C channel.

Figure 4:
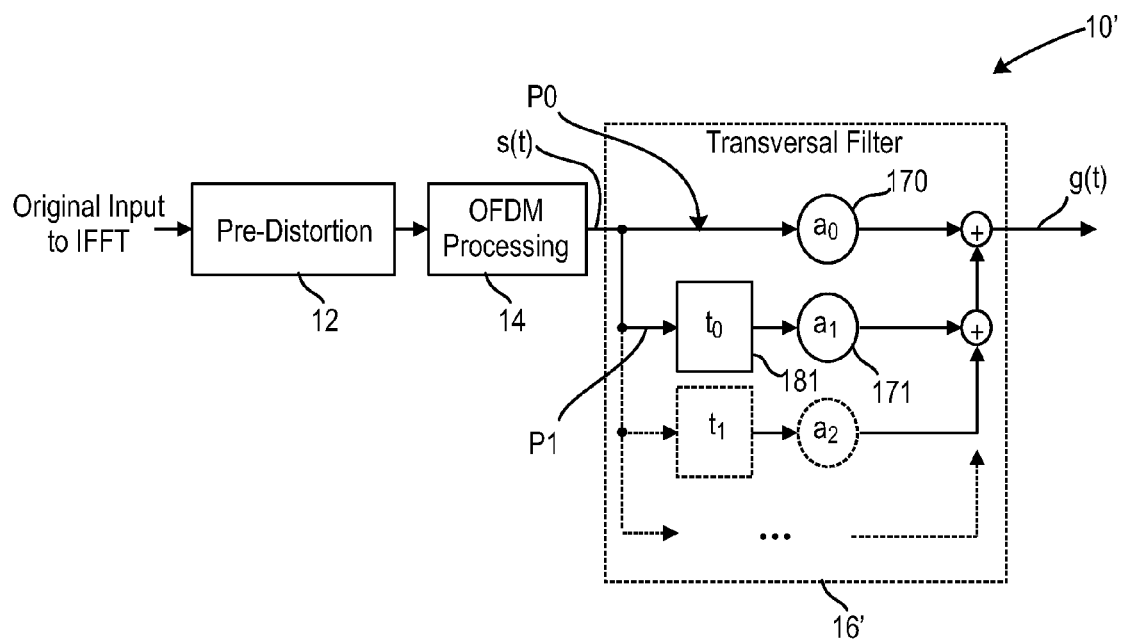
FIG. 4 shows a schematic diagram of another embodiment of an OFDM encoding apparatus according to the present disclosure.

FIG. 4 shows another embodiment of an OFDM encoding apparatus 10' according to the present invention. It includes a particular embodiment of a causal asymmetrical transversal filter 16' of arbitrary length as will be explained below. Generally, the filter 16' may be of arbitrary length, i.e. may have an original signal path P0 and n echo taps P1, P2, ..., Pn. More generally, the filter can also be causal symmetric instead of being asymmetric.

The following formulas show the application of the described filtering using a one tap transversal filter 16', i.e. having the original signal path P0 and a single echo tap P1. The input signal s(t) of the filter 16' is weighted in an weighting unit 170 by a weighting coefficient $a_0$ and accumulated with the first tap echo, which is delayed in a delay unit 181 by delay $t_0$ and weighted in a weighting unit 171 by a weighting coefficient $a_1$. The delay $t_0$ is specific to the resulting shape of the transfer function of the transversal filter 16', which is generally a cosine shaping for a one tap echo. The zero crossings of the transfer function can be adjusted by means of the delay value. The weighting coefficients $a_0$ and $a_1$ are introduced for completeness (as it is not strictly necessary in case of the one tap (0 dB) echo, where $a_1 = a_0$).

The formula is further transformed by means of introducing a symmetrical delay shift of $t_0/2$ to show how to obtain the cosine-shaped transfer function in the frequency domain.

$$g(t) = a_0 s(t) + a_1 s(t - t_0)$$
$$= a_0 s\left(t + \frac{t_0}{2} - \frac{t_0}{2}\right) + a_1 s\left(t - \frac{t_0}{2} - \frac{t_0}{2}\right),$$

where $a_1 = a_0$.

The resulting output signal g(t) of the transversal filter 16' can be transformed into the frequency domain to obtain the transfer function H(f). The phase terms, which are a result of the time domain delays, can be combined into a cosine function and a common phase term $$G(f) = a_0 S(f) + a_0 S(f) e^{-i2\pi f t_0}$$
$$= S(f) \cdot \left[a_0 \left(e^{+2\pi f \frac{t_0}{2}} + e^{-2\pi f \frac{t_0}{2}}\right) e^{-i2\pi f \frac{t_0}{2}}\right]$$
$$= S(f) \cdot \left[2a_0 \cos\left(2\pi f \frac{t_0}{2}\right) e^{-i2\pi f \frac{t_0}{2}}\right]$$
$$= S(f) \cdot H(f).$$

The transfer function H(f) can then be inverted into $H^{-1}(f)$ to obtain the function the OFDM frequency domain signal has to be corrected (multiplied) with to apply the pre-distortion $$H^{-1}(f) = \frac{1}{\left[2a_0 \cos\left(2\pi f \frac{t_0}{2}\right) e^{-i2\pi f \frac{t_0}{2}}\right]} = \frac{1}{H(f)}.$$

The formulas use the following symbols:
s(t): time domain input signal to the transversal filter
g(t): output signal of the transversal filter
$t_0$: time delay of the first echo tap
$a_0$, $a_1$: weighting constant of the non-delay signal and the first echo tap
H(f): transfer function of the transversal filter
$H^{-1}$(f): inverted transfer function of the transversal filter.

Figure 5:
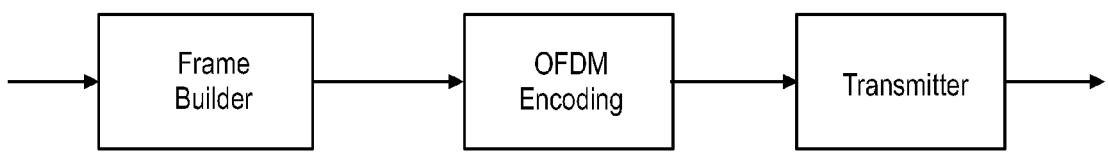
FIG. 5 shows a diagram of a transmission apparatus according to the present disclosure.

FIG. 5 shows a schematic diagram of a transmission apparatus 1 according to the present disclosure. The transmission apparatus 1 comprises a frame builder 20 for building frames comprising said OFDM symbols, an OFDM encoding apparatus 10, 10' as provided according to the present disclosure for encoding said OFDM symbols into an OFDM signal, and a transmitter 30 for transmitting said OFDM signal.

Figure 6:
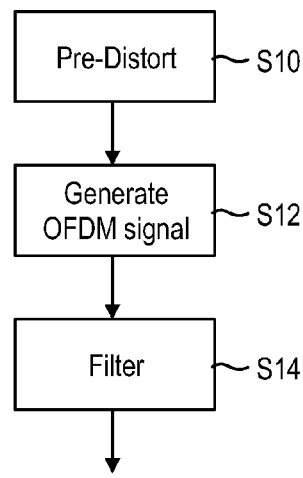
FIG. 6 shows a flowchart of an OFDM encoding method according to the present disclosure.

FIG. 6 shows a flowchart of an OFDM encoding method according to the present disclosure. The OFDM encoding method comprises the following steps. In a first step S10 OFDM symbols are pre-distorted into pre-distorted OFDM symbols, said OFDM symbols comprising payload data and each being carried on multiple OFDM subcarriers. In a second step S12 an OFDM signal is generated from said pre-distorted OFDM symbols by OFDM modulating said pre-distorted OFDM symbols. In a third step S14 said OFDM signal is filtered to obtain a filtered OFDM signal by applying a filter transfer function to said OFDM signal to attenuate the spectrum of the OFDM signal in frequency bands outside the signal bandwidth of said OFDM signal. Said step of pre-distorting S10 is configured to apply a pre-distortion transfer function corresponding to the inverse of said filter transfer function to said OFDM symbols.

Obviously, numerous modifications and variations of the present disclosure are possible in light of the above teachings. It is therefore to be understood that within the scope of the appended claims, the disclosure may be practiced otherwise than as specifically described herein.

In particular, while said pre-distortion unit 12 is preferably configured to apply a linear pre-distortion on said OFDM symbols a non-linear pre-distortion may be applied as well. Preferably, the pre-distortion unit 12 is embodied by a multiplier.

The filter 16, 16' is preferably an n-tap filter, with n being an integer smaller than 5, in particular smaller than 3, wherein at least one path of said n-tap filter comprises a delay unit and/or a weighting unit.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

Any reference signs in the claims should not be construed as limiting the scope.

The invention claimed is:

1. An Orthogonal Frequency-Division Multiplexing (OFDM) encoding apparatus for encoding OFDM symbols into an OFDM signal, the OFDM encoding apparatus comprising:
    first circuitry configured to pre-distort OFDM symbols using a pre-distortion transfer function into pre-distorted OFDM symbols, the OFDM symbols comprising payload data and each being carried on multiple OFDM subcarriers;
    an OFDM generator configured to generate an OFDM signal from the pre-distorted OFDM symbols by OFDM modulating the pre-distorted OFDM symbols; and
    filter circuitry configured to filter the OFDM signal to obtain a filtered OFDM signal and to attenuate a spectrum of the OFDM signal in frequency bands outside a signal bandwidth of the OFDM signal by applying a filter transfer function to the OFDM signal, wherein
    the filter transfer function is a weighted cosine function of $2\pi$ multiplied by a frequency of a respective OFDM subcarrier and multiplied by half of a time delay of a first echo tap of the filter circuitry, in a frequency domain;
    the pre-distortion transfer function is a reciprocal of the filter transfer function; and
    the first circuitry and the filter circuitry cooperate to form the OFDM signal having a flat characteristic within a pass band of the OFDM symbol.

2. The OFDM encoding apparatus as claimed in claim 1, wherein the first circuitry is configured to apply a linear pre-distortion on the OFDM symbols.

3. The OFDM encoding apparatus as claimed in claim 1, wherein the first circuitry is configured to multiply each OFDM subcarrier individually with the reciprocal of the filter transfer function at a frequency of the respective OFDM subcarrier.

4. The OFDM encoding apparatus as claimed in claim 1, wherein the filter circuitry has a pass band.

5. The OFDM encoding apparatus as claimed in claim 1, wherein the filter circuitry comprises an n-tap filter, with n being an integer smaller than 5.

6. The OFDM encoding apparatus as claimed in claim 1, wherein the filter circuitry comprises an n-tap filter, with n being an integer smaller than 3.

7. The OFDM encoding apparatus as claimed in claim 5, wherein at least one path of the n-tap filter comprises delay circuitry.

8. The OFDM encoding apparatus as claimed in claim 5, wherein at least one path of the n-tap filter comprises weighting circuitry.

9. The OFDM encoding apparatus as claimed in claim 1, wherein the filter circuitry comprises a one-tap transversal filter.

10. The OFDM encoding apparatus as claimed in claim 9, wherein an original signal path and the first echo tap each comprises weighting circuitry, and wherein the first echo tap comprises delay circuitry.

11. The OFDM encoding apparatus as claimed in claim 10, wherein the filter transfer function is $$H(f) = 2a_0 \cos\left(2\pi f \frac{t_0}{2}\right) e^{-i2\pi f \frac{t_0}{2}}$$

with $a_0$ being a weighting coefficient for weighting an original OFDM signal in the original signal path and the first echo tap, $t_0$ being the time delay of the first echo tap and f being the frequency of the respective OFDM subcarrier.

12. The OFDM encoding apparatus as claimed in claim 10, wherein the pre-distortion transfer function is $$H^{-1}(f) = \frac{1}{\left[2a_0 \cos\left(2\pi f \frac{t_0}{2}\right) e^{-i2\pi f \frac{t_0}{2}}\right]}$$

with $a_0$ being a weighting coefficient for weighting an original OFDM signal in the original signal path and the first echo tap, $t_0$ being the time delay of the first echo tap and f being the frequency of the respective OFDM subcarrier.

13. An Orthogonal Frequency-Division Multiplexing (OFDM) encoding method for encoding OFDM symbols into an OFDM signal, the OFDM encoding method comprising:
   pre-distorting OFDM symbols using a pre-distortion transfer function into pre-distorted OFDM symbols, the OFDM symbols comprising payload data and each being carried on multiple OFDM subcarriers;
   generating an OFDM signal from the pre-distorted OFDM symbols by OFDM modulating the pre-distorted OFDM symbols;
   filtering, by circuitry, the OFDM signal to obtain a filtered OFDM signal by applying a filter transfer function to the OFDM signal to attenuate a spectrum of the OFDM signal in frequency bands outside a signal bandwidth of the OFDM signal, wherein
   the filter transfer function is a weighted cosine function of $2\pi$ multiplied by a frequency of a respective OFDM subcarrier and multiplied by half of a time delay of a first echo tap of the filter circuitry, in a frequency domain;
   the pre-distortion transfer function is a reciprocal of the filter transfer function; and
   the pre-distorting and the filtering cooperate to form the OFDM signal having a flat characteristic within a pass band of the OFDM symbol.

14. A transmission apparatus comprising:
   a frame builder configured to build frames comprising OFDM symbols;
   an OFDM encoding apparatus as claimed in claim 1 for encoding the OFDM symbols into an OFDM signal; and
   a transmitter configured to transmit the OFDM signal.

15. A transmission method comprising:
   building frames comprising OFDM symbols;
   an OFDM encoding method as claimed in claim 13 for encoding the OFDM symbols into an OFDM signal; and
   transmitting the OFDM signal.

16. A non-transitory computer-readable recording medium having stored therein a computer program product, which, when executed by a processor, performs a method, the method comprising:
   pre-distorting OFDM symbols using a pre-distortion transfer function into pre-distorted OFDM symbols, the OFDM symbols comprising payload data and each being carried on multiple OFDM subcarriers;
   generating an OFDM signal from the pre-distorted OFDM symbols by OFDM modulating the pre-distorted OFDM symbols;
   filtering the OFDM signal to obtain a filtered OFDM signal by applying a filter transfer function to the OFDM signal to attenuate a spectrum of the OFDM signal in frequency bands outside a signal bandwidth of the OFDM signal, wherein
   the filter transfer function is a weighted cosine function of $2\pi$ multiplied by a frequency of a respective OFDM subcarrier and multiplied by half of a time delay of a first echo tap of the filter circuitry, in a frequency domain;
   the pre-distortion transfer function is a reciprocal of the filter transfer function; and
   the pre-distorting and the filtering cooperate to form the OFDM signal having a flat characteristic within a pass band of the OFDM symbol.

\* \* \* \* \*